April 1, 1941. D. E. DREW 2,236,526
NONFIBROUS STRUCTURE AND METHOD FOR PREPARING SAME
Filed Aug. 30, 1938

Donald E. Drew INVENTOR.
BY
ATTORNEY

Patented Apr. 1, 1941

2,236,526

UNITED STATES PATENT OFFICE 2,236,526

NONFIBROUS STRUCTURE AND METHOD FOR PREPARING SAME

Donald Ellsworth Drew, Kenmore, N. Y., assignor to E. I. du Pont de Nemours & Company, Wilmington, Del., a corporation of Delaware Application August 30, 1938, Serial No. 227,524

13 Claims. (Cl. 91—68)

This invention relates to improvements in smooth, nonfibrous, nonporous sheets, films and pellicles and the method of making the same. More particularly, the invention relates to the production of cellulosic pellicles, especially water-sensitive films formed from aqueous, alkaline cellulosic solutions, whereby to enhance certain physical characteristics greatly and consequently their utility to manufacturer, converter, and consumer. The invention will be described with specific reference to regenerated cellulose sheets and films, although it is to be understood that the invention is not limited thereto.

Regenerated cellulose as manufactured in the pure form is characterized by great brittleness and lack of flexibility. Cellulose, however, has a strong affinity for water and, even in the absence of any other softening material, will absorb a substantial amount of water from the surrounding atmosphere. If the surrounding atmosphere is of high relative humidity, such as around 95%, the water absorbed contributes sufficient softness so that only comparatively small amounts of additional softener are necessary to make the film commercially usable. In order, however, to make the film flexible and nonbrittle at all humidities, a substantial amount of a relatively nonvolatile, hygroscopic softener, such as glycerin, is customarily impregnated into the film. When this is done, the moisture absorbed by the film at high relative humidities tends to make it more flexible than is actually necessary. Under such conditions there is a marked increase in the tendency of superimposed films to stick together, particularly when pressure, even though moderate, is applied. This tendency has been a problem affecting the commercial handling of the film for a great many years.

In order to overcome this difficulty, it has been proposed to apply to the surfaces of the film a thin, tenuous coating or sizing, reducing the tendency of stacked sheets to stick together. Heretofore, most of these sizes or anti-sticking agents have been only of limited effectiveness in preventing sticking and/or are not very receptive to water-soluble glues customarily used in the fabrication of packages or the like and/or have a tendency when applied in too large quantities to cause haze or blush in the film and to impair receptivity for aqueous adhesives. For these reasons, it is often highly desirable that the concentration and distribution of the sizing material over the surface of the dried and finished film be perfectly uniform and controlled within very narrow limits.

Transparent, non-fibrous pellicles of cellulosic materials have been produced heretofore by extruding an aqueous, alkaline cellulosic solution or dispersion, for example, viscose, through an elongated extrusion orifice into a coagulating and/or regenerating bath from which the coagulated or regenerated film is passed through suitable purification solutions, for example, desulfuring, bleaching, and washing solutions, then through a softener solution which may also contain the material to be applied as a size or surface modifying agent from which it is led over a series of drier rolls to be finally collected in the form of a roll. It is the characteristic of this drying process that the film, which on entering the drier, is in a gel condition containing a high percentage of water—from 300% to 350%—suffers considerable shrinkage which takes place in the transverse direction principally because the shrinkage in the longitudinal or machine direction is restricted by the tension under which the web is caused to move through the drier. It has now been observed that this transverse contraction of the film is not evenly distributed across the width of the film, but occurs to the greatest extent at the margins of the web and to a lesser extent through the middle portions thereof.

It is the usual practice to apply the softening material and the sizing agent by means of a bath through which the web is run and then remove the excess bath liquid by means of rubber surfaced squeeze rolls. The film thus treated in the gel condition has a uniform distribution of size over both surfaces, and it is in this condition that it enters the drier. It has now been discovered that the shrinkage conditions at the margins of the web will tend to concentrate the size in the margins of the web so that these portions will contain more size than the center part of the web. The increase in the concentration of the size has certain extremely detrimental effects. This increase in concentration, for instance, may be just sufficient to affect the appearance or transparency of the margins of the sheet if sufficient size is applied to prevent sticking of the central portions of the sheet. Also, it has been found that the strength of the adhesive bonds obtained by the use of water-sensitive adhesives generally applied in the construction of bags and other containers from this sheet material is extremely sensitive to the amount of sizing material upon the surface. The strength of the bond, in fact, has been found to be as much as 2 to 3 times as great for the central portion of the sheet as at the marginal edges when previously known methods of application of size have been employed.

The methods heretofore used for the application of size to the film have produced a thin, continuous layer or film upon the surface of the wet cellulosic web. To be sure, this has been effective in the prevention of sticking of sheets when stacked together and subjected to pressure, but it has required that the adhesive either penetrate this film or layer of size, or be dependent upon the bonding of the size to the base sheet in obtaining an adhesive bond.

It has previously been suggested to apply the sizing material by means of applicator rolls or sprays, but in all such cases, the material has been uniformly distributed upon the surface of the gel film with the result, as previously noted, that the distribution upon the surface of the dried film is not uniform.

Where the sizing and the softening agents have been applied by means of dipping the web into a bath of these materials and then smoothing and removing the excess liquid from the surface by means of squeeze rolls or doctor knives, etc., it is the common practice to apply both of these materials from the same bath immediately preceding the drier. It would be extremely difficult, if not impossible, to apply these two materials from separate baths where the solvent or dispersing agent used for one is a solvent for the other because if the softener were applied first, for instance, and the web containing the softener were then passed through a bath containing the sizing agent, more or less of the softening material would be leached from the film by the sizing bath, and similarly, if the size were applied first, it would be removed to some extent by the bath supplying the softener. The process of applying both materials from a common bath has led to certain difficulties. On the one hand, it prevents the use of certain materials which, while they may be excellent in themselves, are not compatible in the bath. On the other hand, contamination of one material will lead to the discard of the entire bath, involving an unnecessary expense. Furthermore, the size employed may not be stable when subjected to the heating conditions, agitation, etc., to which it is necessary to subject the glycerol bath.

It is, therefore, an object of this invention to produce thin, nonfibrous, substantially nonporous sheets and films which are subject to shrinkage during the drying thereof with an improved resistance to sticking together, and, at the same time, with little or no impairment of glue receptivity and a minimum amount of haze or blush.

It is a further object to produce such sheets or films having an improved resistance to sticking together in atmospheres of high relative humidity and/or when impregnated with large quantities of a softening agent.

It is another object of this invention to produce thin, transparent, nonfibrous, substantially nonporous sheets and films which are subject to shrinkage during their drying, the entire surface of which have a uniform resistance to sticking and a uniform receptivity to glue.

It is a still further object to produce such sheets or films of regenerated cellulose or other water-sensitive cellulosic materials.

It is a still further object to provide improved means for the application of sizing materials to such sheets and films.

Other objects will appear hereinafter.

In general, the objects of this invention are accomplished by applying the sizing material to the cellulosic web in the gel condition as a separate operation and in such a manner that the distribution of size across the width of the web will result in uniform distribution across the dried web.

The invention will be more easily understood by reference to the following detailed description when taken in combination with the accompanying drawing, in which.

According to the preferred form of this invention, the sizing or anti-sticking agents are applied to transparent regenerated cellulose sheets while such sheets are in the gel state. This may be accomplished by spraying the film with a solution or dispersion of the sizing agent, together with an emulsifying agent where such is desirable. This may be conveniently done after the web leaves the softening bath and squeeze rollers or doctor knives for removing the excess softener, such as glycerol, and just prior to the drying operation.

Figure 1:
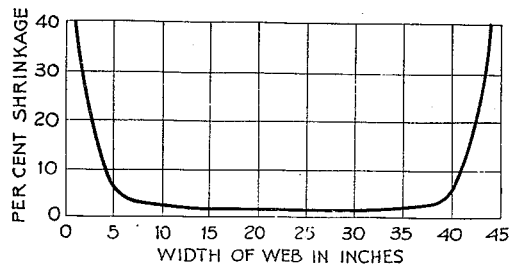
Figure 1 is a curve showing the distribution or amount of shrinkage for different points across the width of the web.

The curve shown in Figure 1 of the drawing illustrates the approximate degree of shrinkage for various portions across the width of a typical web of regenerated cellulose. It is to be understood, of course, that the distribution and degree of shrinking will differ in different films according to the characteristics of the particular film, the temperature and rate of drying, the surface condition of the rolls over which the film is passed, etc. Where the film will shrink or contract upon drying, however, such a curve will show that the edges of the film contract or shrink to a greater extent than the central portion of the film and thus that the resulting concentration of size added in a uniform manner to the gel film will be greater at the margins of the film than in the central portion. By the method of the invention, it is possible to so control the application of size to the gel film that when the uneven shrinkage represented by Figure 1 takes place there will be produced a film with uniform concentration of sizing material throughout its width.

Figure 2:
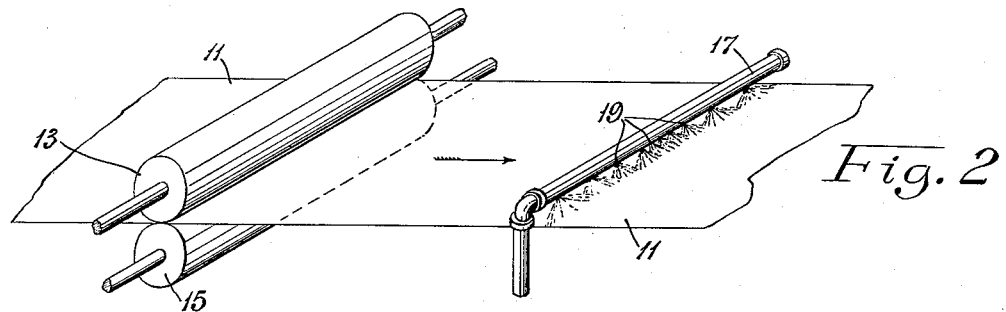
Figure 2 is a diagrammatic illustration of one embodiment of an apparatus involving a spray application of sizing material in accordance with the present invention.

Referring to Figure 2 of the drawing, reference numeral 11 designates a thin sheet of nonfibrous, substantially nonporous material, such as regenerated cellulose, which has a tendency to shrink during the drying thereof. The sheet 11, after being purified, washed, and a suitable softening agent incorporated therein, is passed between a set of squeeze rolls 13 and 15 for the removal of excess softener solution. The film is then passed, adjacent to a spray device 17 for the application of an anti-sticking sizing material to the sheet. The device 17 is positioned across the surface of the sheet so that the sizing material will be sprayed on to the surface thereof. A plurality of nozzles 19 are positioned on the spray device 17. The nozzles 19 which are adjacent the central portion of the sheet 11 are arranged more closely to each other than those nozzles which are adjacent the sides of the sheet 11. As a consequence the film of sizing material applied to the sheet 11 will be thicker in the central portion of the sheet. The spacing of the nozzles 19 can be arranged to apply a film of sizing material varying in thickness proportionate to the variation in shrinkage of the sheet so that the dry sheet, after shrinkage has taken place, will contain a layer of sizing material of uniform thickness over the entire surface.

Figure 3:
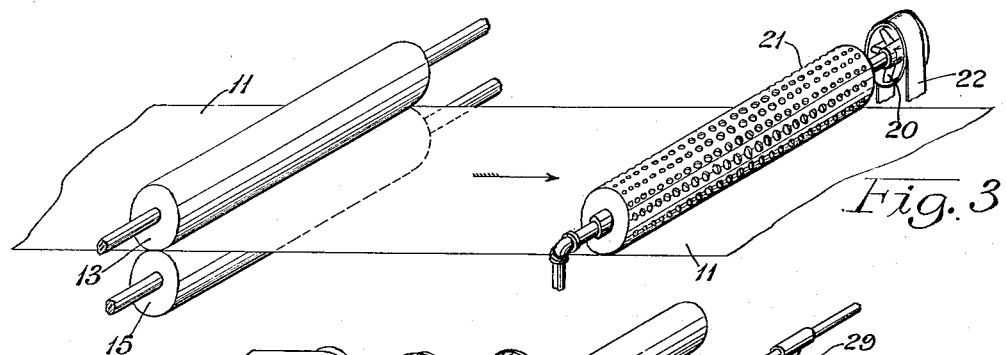
Figure 3 is a similar diagrammatic illustration of another embodiment of an apparatus constructed in accordance with the principles of this invention showing application of size by means of a roll.

In the modification shown in Figure 3 of the drawing, the sheet 11 after passing between the squeeze rolls 13 and 15 is passed under a perforated applicator roll 21. The perforations in roll 21 are made larger at the center portion thereof so that more sizing material will be applied to the central portion of the sheet than to the sides thereof. The size and spacing of the perforations in roll 21 can be so arranged as to produce a sheet, which after shrinkage during drying, will contain a layer of sizing material of uniform thickness. The applicator roll 21 is preferably rotated, for example, by means of pulley 20 and belt 22.

Figure 4:
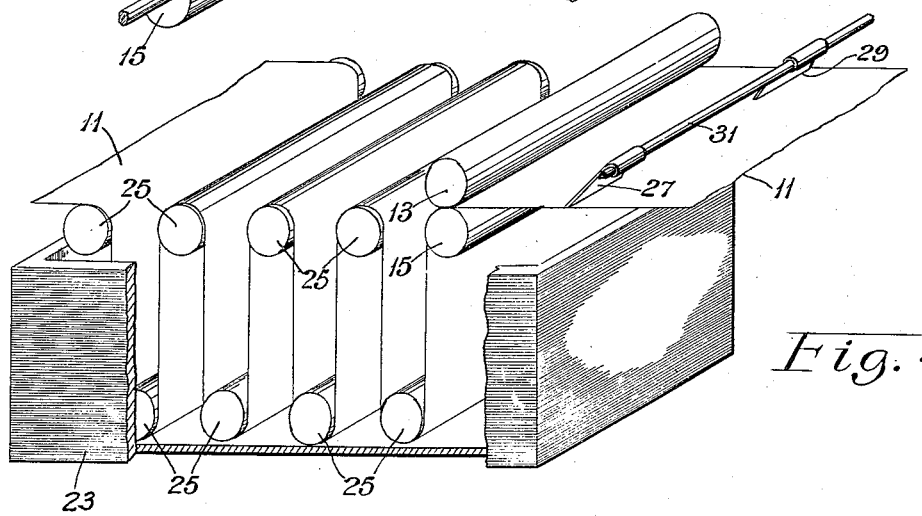
Figure 4 is another diagrammatic illustration of a third embodiment of apparatus constructed in accordance with this invention.

Referring to Figure 4 of the drawing, the sheet 11 of shrinkable, nonfibrous material is passed through a solution in tank 23. This solution is preferably an aqueous solution of a softener and a suitable anti-sticking sizing material. The sheet 11 after being suitably purified and washed is passed over a series of rolls 25 whereby to thoroughly impregnate the sheet with softening and sizing agents. The sheet is then passed through squeeze rollers 13 and 15, and is then passed into contact with the spaced scraper or doctor knives 27 and 29. These knives 27 and 29 are positioned on a support 31. The support 31 being arranged transversely across the sheet 11. The knives are positioned at the two marginal sides of the sheet to scrape some of the softening and sizing material from these portions of the sheet. The sheet after passing the doctor knives will, consequently, contain more softening and sizing material in the central portion than in the sides thereof.

Obviously, the sizing material can be applied in any desired thickness and on one or both sides of the sheet. Furthermore, the variation in the thickness of the film of the sizing material applied can be regulated to correspond to the shrinkage characteristics of any particular sheet material.

Any desired sizing material may be applied in accordance with the present invention. As examples of sizing preparations to be applied to the film may be mentioned water dispersions of waxy amides or derivatives of amides, which are solid at ordinary temperatures and have a melting point above about 60° C. As emulsifying or dispersing agents for these amidic substances may be mentioned a mixture of sodium silicate and stearic acid. A water dispersion of sodium silicate in stearic acid may in itself be used as a size. Other water dispersable instance include dewaxed shellac, cellulose derivatives, slightly water soluble salts such as lithium phosphate, etc. In addition, certain sizes may be applied from nonaqueous solutions, such as for example, ethyl cellulose and stearamide, ethyl cellulose and stearic acid, and stearamide and stearylamine, etc.

The space surrounding the sprays, or that part of the film being coated, may be encased in a special housing with suitable entrance and exit for the film and suitable means provided for collecting the excess solution which does not deposit upon the surface of the film. Such accessories, however, are not essential for the performance of the apparatus in accordance with the invention.

As a specific example, a gel film 52 inches wide may be passed at a speed of 50 meters per minute between two sets of three nozzles each, spaced 15 inches from the web. The nozzles are located opposite the center, and opposite points 8.5 inches from the edge of the web. A sizing dispersion is prepared as follows: 1.1 parts of solid octadecyl amide and 1.3 parts of stearic acid are melted and added to 56 parts of water and thoroughly mixed. 2.0 parts of sodium silicate solution comprising 28% $SiO_2$, 8.5% $Na_2O$, and 63.5% $H_2O$ are then added with stirring. The concentrated dispersion thus formed is then added at a temperature of 85°–90° C. with stirring to an aqueous bath containing 7.5% glycerin to form a 0.4% colloidal dispersion of total solids. A supply of the above-described aqueous dispersion is pumped to the spray device 19 shown in Figure 2 and supplied at the rate of 1.0 gallon per hour to each of the two centrally located nozzles and at a rate of 0.5 gallon per hour to each of the four nozzles at the edges of the web. Air is supplied to the nozzle at a pressure of 30 pounds per square inch.

Where the sizing preparation contains particles of a relatively large size or a dispersion which is not stable over a sufficiently long period of time to allow for its storage in a supply reservoir and subsequent application through the spray nozzle, the reservoir may be supplied with a suitable agitating mechanism or a homogenizer may be put in line with the spray nozzles.

Although the invention has been described with reference to three specifically described embodiments of method and apparatus for application of the sizing material, any other method or apparatus of applying the size may be employed in which the amount of size applied at different points across the width of the film may be controlled. For instance, the sizing preparation may be applied by means of applicator rolls, several of these rolls being required to cover the distance between one edge of the film and the opposite edge with means provided for applying the sizing preparation in different concentrations at different points across the film. For instance, such means may include separate reservoirs supplying the sizing preparation at different concentrations to the various applicator rolls. Thus, the applicator roll supplying a central portion of the film will have a solution at higher concentration than that supplied to the rolls coating the marginal portions of the web, or a solution of the same concentration may be applied in different degrees by means of doctor knives or squeeze rollers to the different applicator rolls.

In carrying out the sizing treatment, it is essential that the solution be so prepared that the quantity be so controlled and that drying be so carried out that the final product is substantially not inferior to similar unsized products, particularly in the retention of transparency and brilliance and in receptiveness to the usual aqueous adhesives. Furthermore, the product should resist cohesion, such as caking of stacked sheets when stored under pressure and/or exposed to atmospheres of high humidity as much as, or more than similar unsized sheets, even though the product may contain as much as twice the quantity of softening agent as the unsized product. For this reason, many restrictions are placed upon the sizing or anti-sticking composition and upon the method of application to the film.

It will be seen from the foregoing that in the preparation of the product, it is necessary to overcome certain obstacles which are not encountered in any other product now known. Whereas stacks of transparent regenerated cellulose sheets are readily caked or stuck together by increases in moisture or pressure, paper, being porous, less hygroscopic, and relatively rough in surface, exhibits no such action. Even the glassine papers which most nearly approach transparent regenerated cellulose film are free from caking or sticking. Cohering and gluing of transparent regenerated cellulose sheets differ widely from any such problem which has been encountered in the paper field. Even the densest of papers is sufficiently porous that a wide variety of aqueous type adhesives can be used. For example, starch, casein, dextrin, and gelatin agglutinants provide suitable adhesion. Plain transparent regenerated cellulose sheets, on the other hand, are smooth, nonfibrous and substantially impervious to the usual colloidal agglutinant products and hence require specially compounded adhesives to secure proper adhesion of the smooth and substantially impermeable surface. Therefore, sizing or anti-sticking agents which would in no way affect the gluing properties of glassine paper, for example, would so prevent the wetting and adhesion of an aqueous adhesive on the surface of transparent regenerated cellulose pellicles that no useful adhesion whatsoever would result. It thus becomes apparent that the sizing of regenerated cellulose pellicles which would improve the sticking resistance of said pellicles and at the same time permit the pellicles to remain receptive to aqueous adhesives which are satisfactory for use with untreated pellicles constitutes an outstanding contribution to the art. Needless to say, there are many uses to which cellulosic pellicles of the type described might be put wherein the anti-sticking characteristic is of major importance while the receptivity to aqueous adhesives is of little concern. In such cases, a pellicle having improved sticking resistance and transparency, regardless of its receptivity to aqueous adhesives, will be useful, and the production of such pellicles comes well within the scope of the present invention.

Likewise, the adhesion of printing inks to surfaces of transparent regenerated cellulose pellicles is often greatly impaired except where the gluable structures of the present invention are employed. One very practical feature of the process of this invention is that it may be carried out at practically no increase in cost and with very little alteration in the machines usually used for producing transparent regenerated cellulose sheets or in the methods of subsequent handling by the manufacturer or converter or consumer.

The method of the invention for the application of sizing material to sheets of regenerated cellulose has numerous advantages over the methods heretofore employed in the art. The method not only permits of perfectly uniform distribution of sizing material upon the surface of finished pellicles, but likewise permits of the control of this concentration to a value productive of the optimum surface conditions. Heretofore, it was only possible to approximate the optimum concentration in one portion of the film since that of another portion would differ from the first. For instance, by the old method, it was not always possible to have sufficient sizing upon the central portion of the film, since the concentration at the margins would be greater because of shrinkage and hence, perhaps, exceed the limit required for good transparency, gluability, etc. Where the concentration was controlled to give the optimum conditions at the margins of the pellicle, the central portions thereof very often did not possess sufficient stick resistance.

A spray method of application has the decided advantage that it is possible thereby to deposit the sizing material upon the surface of the film in minute, isolated, closely arranged points rather than as a smooth, continuous film. Such isolated points serve admirably to prevent the sticking of sheets together when subjected to pressure and hinder to a much less extent the bonding of the adhesive to the base sheet.

Many sizing and anti-sticking agents are readily contaminated by chemicals which may be present in the pellicle or which may be carried over from previous treating baths. Where the sizing agent was added to the softening bath, such contamination frequently reduced the effectiveness, sometimes to the vanishing point, of the sizing material.

Likewise, the method of the present invention obviates the necessity for contaminating the softening or other baths with the sizing agent.

Although this invention has been described with specific reference to the sizing of gel regenerated cellulose film, it may also be applied to film which has been dried and rewetted. However, this procedure is generally to be avoided, since it necessitates an additional step in the manufacture, thus increasing the cost. It is also applicable to other smooth, nonfibrous, nonporous sheets and films which are subject to shrinkage during the drying thereof and which, because of their high content of softener, have a tendency to stick together. As samples of other sheets and films to which the present invention is applicable may be named water-sensitive pellicles cast from aqueous or alkaline-aqueous cellulosic solutions including lowly substituted cellulose ethers and esters and ether-esters, such as glycol cellulose, methyl cellulose, ethyl cellulose, cellulose glycollic acid, and cellulose phthallic acid.

Since it is obvious that many changes and modifications can be made in the above-described details without departing from the nature and spirit of the invention, it is to be understood that the invention is not to be limited except as set forth in the appended claims.

I claim:

1. The method of coating a wet sheet of water sensitive nonfibrous, substantially nonporous material which is subject to greater shrinkage at the marginal portions than at the central portions during the drying thereof after said coating application which comprises applying said coating in greater thickness on the central portion of said sheet than at the marginal portions thereof, and drying said coated sheet.

2. The method of sizing a sheet of water sensitive nonfibrous, substantially nonporous material which is subject to shrinkage during the drying thereof which comprises applying said sizing to the wet sheet in greater thickness on the central portion of said sheet than at the marginal portions thereof, and thereafter drying said sized sheet in such a manner that the marginal portions shrink more than the central portion.

3. The method of sizing a sheet of water sensitive nonfibrous, substantially nonporous material which is subject to shrinkage during the drying thereof which comprises applying said sizing to the wet sheet in greater thickness on the central portion than at the marginal portions thereof, applying said sizing to the marginal portions of said sheet in progressively decreasing thickness toward the extreme outer edges, and thereafter drying said sheet in such a manner that the marginal portions shrink more than the central portion.

4. The method of sizing a sheet of gel regenerated cellulose which comprises applying said sizing in greater thickness on the central portion of said sheet than at the marginal portions thereof, and drying said sheet.

5. The method of sizing a sheet of water-sensitive nonfibrous, substantially non-porous material which is subject to greater shrinkage at the marginal portions than at the central portions during the drying thereof which comprises spraying said sizing on to the wet sheet, the amount of sizing sprayed on to the central portion of said sheet exceeding the amount sprayed on to the marginal portions thereof, and thereafter drying said sized sheet in such a manner that the marginal portions shrink more than the central portion.

6. The method of sizing a sheet of water sensitive nonfibrous, substantially nonporous material which is subject to greater shinkage at the marginal portions than at the central portions during the drying thereof which comprises applying said sizing on to the wet sheet, removing a portion of said sizing from the marginal portions of said sheet, and thereafter drying said sheet in such a manner that the marginal portions shrink more than the central portions.

7. The process of preparing uniformly sized dried regenerated cellulose sheet, which comprises determining the widthwise shrinkage pattern of the sheet during drying and applying a size to the undried sheet, the amount of size applied to the sheet being inversely proportioned to the shrinkage of that portion of the sheet where it is applied, and thereafter drying the sheet so that it shrinks in the predetermined pattern.

8. The process which comprises passing a gel regenerated cellulose film 52 inches wide at a speed of 50 meters per minute between two sets of three sprays, there being one spray of each set opposite the center of the web and two sprays of each set located 8.5 inches in from the edge of the gel film, pumping, together with air at 30 pounds per square inch, a sizing and softening solution at a rate of 1.0 gallon per hour to each of the two center sprays and at a rate of 0.5 gallon per hour to each of the four side sprays, said solution being a 0.4% colloidal dispersion of total solids obtainable by melting together 1.1 parts of octadecyl amide, 1.3 parts of stearic acid, adding 56 parts of water, mixing thoroughly, adding with stirring 2.0 parts of a sodium silicate solution comprising 28% $SiO_2$, 8.5% $Na_2O$ and 63.5% $H_2O$ and adding to a 7.5% glycerin-water bath with stirring and at 85°–90° C. until the said colloidal solution is obtained, and thereafter drying the sized sheet.

9. A sized gel regenerated cellulosic pellicle having a greater concentration of size on its central portion than on its edge portion.

10. The product of claim 9 when the size concentration decreases progressively from the central toward the marginal portion.

11. The process of preparing uniformly sized dry regenerated cellulose web from gel regenerated cellulose web, which comprises determining the widthwise shrinkage pattern of the web during drying and applying a size to the web while it is still wet, the amount of size applied to the web being inversely proportioned to the shrinkage of that portion of the web where it is applied, and thereafter drying the web so that it shrinks in the predetermined pattern.

12. The method of sizing a sheet of water sensitive nonfibrous, substantially nonporous material which is subject to shrinkage during the drying thereof which comprises applying said sizing to the wet sheet in greater thickness on the central portion of said sheet than at the marginal portions thereof, applying said sizing to the marginal portions of said sheet in progressively decreasing thickness proportional to the increase in shrinkage of the sheet toward the extreme outer edges during drying, and drying said sized sheet in such a manner that the marginal portions shrink more than the central portion.

13. The process of preparing a thin, transparent sheet having a uniform surface receptivity to aqueous adhesives, which comprises sizing a wet, water sensitive regenerated cellulosic sheet subject to shrinking during drying, in such a manner that the size concentration decreases progressively from the central portion through the marginal portions, and thereafter drying said sized sheet in such a manner that the marginal portions shrink an amount inversely proportional to the size concentration.

DONALD E. DREW.